US012640423B2

(12) United States Patent
Murakami et al.

(10) Patent No.: US 12,640,423 B2
(45) Date of Patent: May 26, 2026

(54) BATTERY PACK

(71) Applicant: DENSO CORPORATION, Kariya (JP)

(72) Inventors: Takahiro Murakami, Toyota (JP); Hironobu Kawashima, Toyota (JP); Hiromi Adachi, Toyota (JP); Takeshi Honda, Toyota (JP); Ryo Yamakawa, Kariya (JP); Hidemitsu Watanabe, Kariya (JP); Masahiro Sakakibara, Kariya (JP)

(73) Assignee: DENSO CORPORATION, Kariya (JP)

( * ) Notice: Subject to any disclaimer, the term of this patent is extended or adjusted under 35 U.S.C. 154(b) by 627 days.

(21) Appl. No.: 18/171,913

(22) Filed: Feb. 21, 2023

(65) Prior Publication Data

US 2023/0198066 A1     Jun. 22, 2023

Related U.S. Application Data

(63) Continuation of application No. PCT/JP2021/032662, filed on Sep. 6, 2021.

(30) Foreign Application Priority Data

Oct. 6, 2020     (JP) ................................. 2020-169109

(51) Int. Cl.
| | |
|---|---|
| *H01M 50/204* | (2021.01) |
| *H01C 7/00* | (2006.01) |
| *H01M 10/48* | (2006.01) |
| *H01M 50/284* | (2021.01) |
| *H01M 50/298* | (2021.01) |
| *H01M 50/569* | (2021.01) |

(52) U.S. Cl.
CPC .......... *H01M 50/204* (2021.01); *H01C 7/008* (2013.01); *H01M 10/48* (2013.01); *H01M*

*50/284* (2021.01); *H01M 50/298* (2021.01); *H01M 50/569* (2021.01)

(58) Field of Classification Search
CPC .. H01M 50/204; H01M 10/48; H01M 50/284; H01M 50/298; H01M 50/569; H01M 10/482; H01M 10/486; H01C 7/008; Y02E 60/10; H05K 1/03; H05K 9/00
See application file for complete search history.

(56) References Cited

U.S. PATENT DOCUMENTS

| | | | | |
|---|---|---|---|---|
| 2014/0342191 A1* | 11/2014 | Shin | ..................... | H05K 1/0201 |
| | | | | 429/7 |
| 2014/0370343 A1* | 12/2014 | Nomoto | ............. | H01M 50/249 |
| | | | | 29/842 |

FOREIGN PATENT DOCUMENTS

| | | | | | |
|---|---|---|---|---|---|
| JP | 2013143281 A | * | 7/2013 | | |
| JP | 2019-192806 A | | 10/2019 | | |
| WO | WO-2013108786 A1 | * | 7/2013 | .......... | H01M 50/284 |

* cited by examiner

*Primary Examiner* — Daniel S Gatewood
(74) *Attorney, Agent, or Firm* — Oliff PLC

(57)     ABSTRACT

A battery pack comprises a battery and a flexible printed circuit board (FPC) utilized to detect a voltage and a temperature of the battery. The FPC comprises a substrate having a front surface and a back surface, a thermistor which detects a temperature of the battery, temperature detection lines and voltage detection lines. The temperature detection lines are electrically connected to a thermistor and arranged between the back surface and the battery. The voltage detection lines are arranged on the front surface so as to overlap the temperature detection lines in a case that the FPC is observed in a plane view in a transmissive manner from a back surface to a front surface.

5 Claims, 7 Drawing Sheets

BATTERY PACK

CROSS REFERENCE TO RELATED APPLICATIONS

The present application is a continuation application of International Patent Application No. PCT/JP2021/032662 filed on Sep. 6, 2021, which designated the U.S. and is based on and claims the benefit of priority from Japanese Patent Application No. 2020-169109 filed on Oct. 6, 2020, and the entire disclosure of the above application is incorporated herein by reference.

TECHNICAL FIELD

The present disclosure relates to a battery pack.

BACKGROUND

The battery pack needs a voltage monitoring system in order to monitor a voltage of a battery or each of a plurality of battery cells in the battery pack. In addition, the battery pack also needs a temperature monitoring sensor system in order to monitor an inside temperature of a battery or each temperature on several locations or a plurality of battery cells in the battery pack. A reliable temperature monitoring sensor system is required. In the above aspects, or in other aspects not mentioned, there is a need for further improvements in a battery pack.

SUMMARY

A battery pack according to one aspect of the present disclosure includes an assembled battery, and a flexible printed circuit board arranged along the assembled battery and utilized to detect a voltage and a temperature of the assembled battery. The flexible printed circuit board includes: a substrate having a front surface and a back surface; a thermistor which detects the temperature of the assembled battery; temperature detection lines electrically connected to the thermistor and arranged between the back surface and the assembled battery; and voltage detection lines arranged on the front surface to overlap the temperature detection lines in a case that the flexible printed circuit board is observed in a plane view in a transmissive manner from the back surface to the front surface.

In the above configuration, the voltage detection line is arranged to overlap the temperature detection line in the case that the flexible printed circuit board is observed in a plane view in a transmissive manner. In other words, the voltage detection lines are arranged to cover the temperature detection lines. That is, the temperature detection lines are sandwiched between the voltage detection lines and the electrical equipment. Since the voltage detection lines function as a shield, noise superimposed on the temperature detection lines can be suppressed. This flexible printed circuit board is configured with a simple structure in which a dedicated layer for shielding is not provided. Furthermore, according to the above configuration, noise can be suppressed from being superimposed on the temperature detection lines with a simple configuration.

According to the present disclosure, in a battery pack including a flexible printed circuit board, it is possible to suppress superimposition of noise on the temperature detection line with a simple configuration.

DETAILED DESCRIPTION

Figure 1:
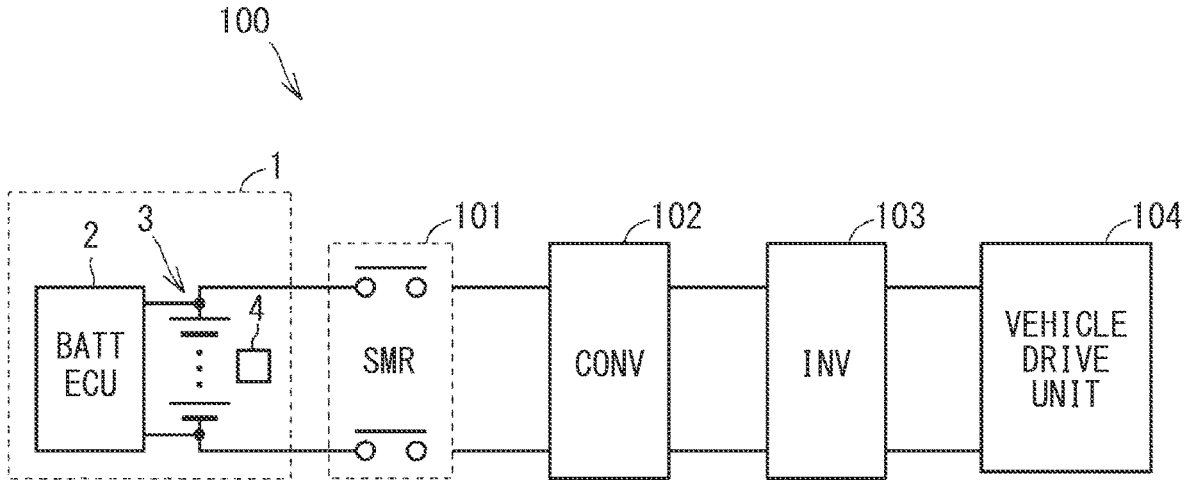
FIG. 1 is a circuit block diagram schematically showing an overall configuration of a vehicle to which a flexible printed circuit board according to an embodiment of the present disclosure is applied.

In recent years, FPCs, which are flexible printed circuit boards, have been used in many electric devices. FPC is an abbreviation for Flexible Printed Circuit. An electromagnetic wave noise may be on wiring patterns such as signal lines arranged on the FPC. Therefore, an FPC capable of suppressing noise superimposition has been proposed.

For example, an FPC disclosed in JP2019-192806A includes a laminated wiring board extending in one direction and a shield film. In this shield film, a shield layer having a conductive property is formed on one side of an insulating coating layer having an insulating property. The shield film is configured to cover an upper surface and a lower surface of the laminated wiring board with a side of the shield layer and at least a part of both end surfaces in the other direction in a plane parallel to the upper surface of the laminated wiring board with a side of the shield layer. The other direction is a direction orthogonal to the one direction described above.

Some FPCs have temperature detection lines. The temperature detection lines are electrically connected to a thermistor for detecting a temperature of an electrical equipment. If noise is superimposed on the temperature detection lines, current caused by the noise flows through the thermistor, then the thermistor could generate heat. Then, there is a possibility that a detection error may occur in the temperature of the assembled battery. The electrical device is, for example, an assembled battery arranged in a battery pack.

The FPC disclosed in JP2019-192806A may suppress superimposition of noise with a shield film. Therefore, it is necessary to add layers dedicated to shielding (shield layers) to the upper and lower surfaces of the laminated wiring board (that is, both the front and back surfaces of the FPC). Therefore, the cost of the FPC may increase compared to a structure without a shield layer. In order to reduce costs, it is desirable to be able to suppress noise superimposition with a simpler configuration.

The present disclosure made to solve such problems. It is an object of the present disclosure to provide a technology capable of suppressing superimposition of noise on temperature detection lines with a simple configuration in a battery pack including a flexible printed circuit board.

Hereinafter, embodiments of the present disclosure are described with reference to the drawings. The same or corresponding parts in the drawings are denoted by the same reference numerals, and the description thereof will not be repeated.

A configuration in which the flexible printed circuit board according to the present disclosure is applied to a vehicle is described below as an example. However, the application of the flexible printed circuit board according to the present disclosure is not limited to vehicles, and may be applied to electrical equipment in general.

Embodiment

<Vehicle Configuration>

FIG. 1 is a circuit block diagram schematically showing an overall configuration of a vehicle to which a flexible printed circuit board according to an embodiment of the present disclosure is applied. Referring to FIG. 1, a vehicle 100 includes a battery pack 1. The battery pack 1 includes a battery ECU 2 (Electronic Control Unit), a battery 3 and a monitoring unit 4. The vehicle 100 further includes a system main relay (SMR) 101, a converter 102, an inverter 103 and a vehicle drive unit 104.

The battery ECU 2 manages a state of the battery 3. Specifically, the battery ECU 2 calculates a remaining battery capacity (SOC: State Of Charge) of the battery 3 and estimates a state of deterioration of the battery 3 (SOH: State Of Health).

The battery 3 is an assembled battery. Each single battery (cell) which configures the assembled battery is a secondary battery such as a lithium-ion battery or a nickel-metal hydride battery. The battery 3 stores electric power to be supplied to the vehicle drive unit 104. Also, the battery 3 is charged with electric power generated by the vehicle drive unit 104. Note that a large-capacity capacitor such as an electric double layer capacitor may be employed instead of the battery 3.

A monitoring unit 4 includes various sensors for monitoring the state of the battery 3. Specifically, the monitoring unit 4 includes a voltage sensor, a current sensor, and a temperature sensor (not shown). A voltage sensor detects a voltage VB of the battery 3. A current sensor detects a current IB that is input to and output from the battery 3. A temperature sensor detects a temperature TB of the battery 3. Each sensor outputs a signal indicating the detection result to the battery ECU 2.

Figure 3:
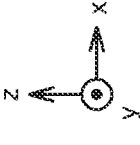
FIG. 3 is a diagram showing an example of a configuration of a battery pack.

In this embodiment, the battery pack 1 includes a cover 5, a plurality of cells 6, and an FPC 7 (see FIG. 3 for all). The FPC 7 transmits signals from the sensors to the battery ECU 2. A configuration of the FPC 7 is described later.

The SMR 101 is electrically connected between the battery 3 and the converter 102. An electrical power transmission between the battery 3 and the converter 102 is enabled by the SMR 101 being conductive.

The converter 102 is electrically connected between the SMR 101 and the inverter 103. When the vehicle 100 is driven to run, the converter 102 boosts a voltage of the DC power supplied from the battery 3 and outputs the boosted voltage to the inverter 103. If the vehicle 100 is running, the battery 3 is discharged. Further, if the vehicle drive unit 104 generates electric power (when the battery 3 is charged), a voltage of the DC power supplied from the inverter 103 is stepped down and output to the battery 3.

The inverter 103 is electrically connected between the converter 102 and the vehicle drive unit 104. The inverter 103 converts the DC power from the converter 102 into the AC power and outputs the AC power to the vehicle drive unit 104. The vehicle drive unit 104 is, for example, a motor generator. The inverter 103 also converts the AC power generated by the vehicle drive unit 104 into the DC power, and outputs the DC power to the inverter 103.

The vehicle drive unit 104 is a device for driving the vehicle 100. The vehicle drive unit 104 includes a motor generator. The vehicle drive unit 104 may also include an engine, a power split device, drive wheels (none of which are shown), and the like.

Figure 2:
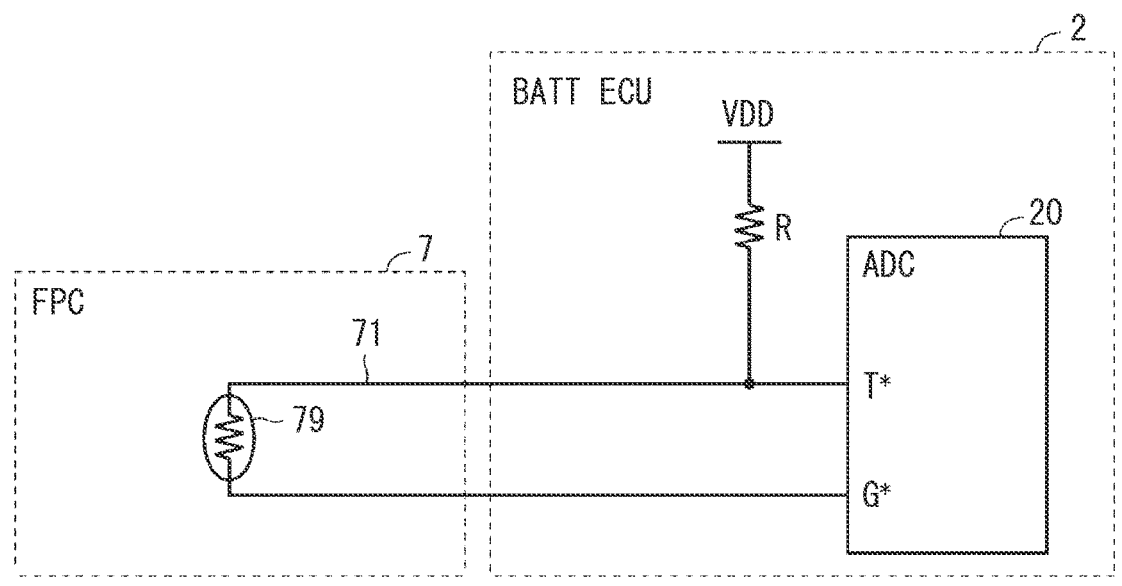
FIG. 2 is a circuit block diagram showing an example of a circuit configuration for detecting a battery temperature.

FIG. 2 is a circuit block diagram showing an example of a circuit configuration for detecting a temperature TB of the battery 3. Referring to FIG. 2, the FPC 7 includes a thermistor 79 installed in the battery 3 (cells 6 described later). The thermistor 79 is, for example, a negative temperature coefficient (NTC) thermistor. However, it is not essential that the thermistor 79 be an NTC thermistor.

The thermistor 79 and the battery ECU 2 are electrically connected by temperature detection lines 71 formed on the FPC 7. A temperature TB of the battery 3 detected by the thermistor 79 is transmitted to the A/D converter 20 in the battery ECU 2 via the temperature detection lines 71. Features of the temperature detection lines 71 are described in detail with reference to FIGS. 5, 6 and 7.

<Battery Pack Configuration>

FIG. 3 is a diagram showing an example of a configuration of the battery pack 1. FIG. 3 schematically shows a side view of the battery pack 1. In each drawing from FIG. 3, an x-direction, a y-direction, and a z-direction are orthogonal to each other. The x-direction and the y-direction are horizontal. The vertical direction is a downward direction along the z-direction. Hereinafter, an upper side in the z-direction may be simply described as "an upper side" and a lower side in the z-direction may simply be described as "a lower side." As shown in FIG. 3, the battery pack 1 includes a cover 5, a plurality of cells 6, and an FPC 7.

The cover 5 is arranged on the upper side of the plurality of cells 6. In this example, a configuration of the battery pack 1 is not a closed structure, and both ends in the horizontal direction (the x-direction in FIG. 2) are open. Therefore, an electromagnetic wave noise generated outside the battery pack 1 and propagating in the horizontal direction may enter an inside of the battery pack 1. Moreover, if material of the cover 5 is a non-metal such as resin, the battery pack 1 is susceptible to an electromagnetic wave noise even if it has a sealed structure.

A plurality of cells 6 are arranged in the horizontal direction (the x-direction). Although the number of cells 6 is not particularly limited, it is typically from several tens to several hundreds of cells. FIG. 3 shows some of the many cells 6 which configures the battery pack 1.

The FPC 7 is arranged directly above the plurality of cells 6. FPC 7 is arranged between the cells 6 and the cover 5. The FPC 7 transmits signals from the voltage sensor and the thermistor (not shown) to the battery ECU 2 as described above.

Figure 4:
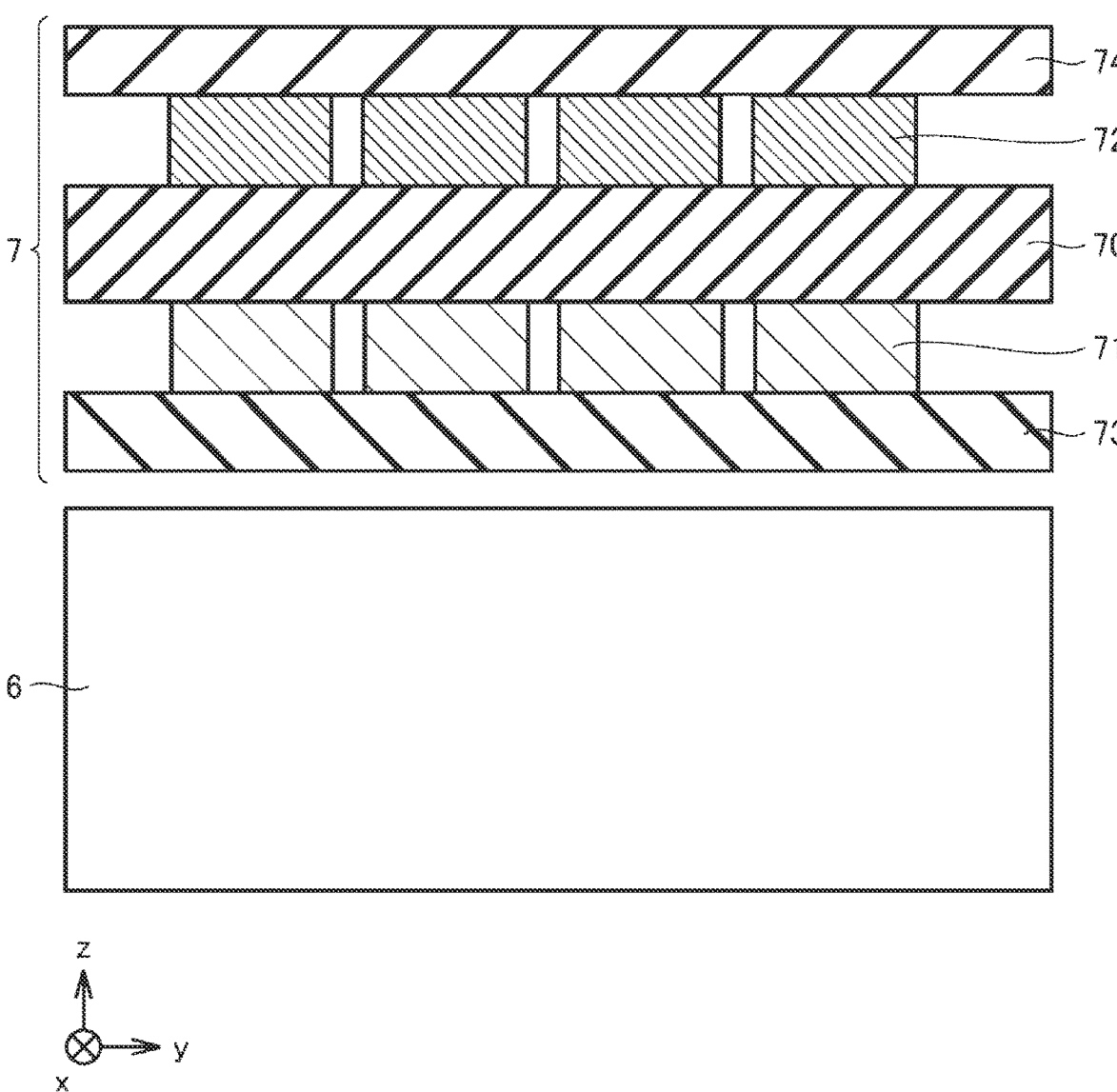
FIG. 4 is a cross-sectional view of a cover, cells, and a flexible printed circuit board along a line IV in FIG. 3.

FIG. 4 is a cross-sectional view of the cover 5, the cells 6 and the FPC 7 taken along a line IV in FIG. 3. Referring to FIG. 4, the FPC 7 includes a substrate 70, temperature detection lines 71, voltage detection lines 72, and coverlays 73 and 74.

The substrate 70 is a thin and soft (flexible) base film. The substrate 70 has an insulating property. Polyimide is typically used as the material of the substrate 70.

The temperature detection line 71 is a wiring pattern formed on a conductive property layer such as a copper foil. The temperature detection line 71 is arranged on the lower side of the substrate 70. The temperature detection line 71 is arranged on the back surface of the substrate 70.

The voltage detection line 72 is a wiring pattern formed on a conductive property layer, similar to the temperature detection line 71. The voltage detection line 72 is arranged on the upper side of the substrate 70. The voltage detection line 72 is arranged on the front surface of the substrate 70.

Each of the coverlays 73 and 74 is a cover film which covers the wiring patterns. The coverlays 73 and 74 have an insulating property. Polyimide may also be used as a material for the coverlays 73 and 74. The coverlay 73 is arranged on a further lower side of the temperature detection lines 71. The coverlay 74 is arranged on the upper side of the voltage detection lines 72.

<Wiring Patterns of FPC>

If an electromagnetic wave noise is superimposed on the temperature detection lines 71, current flows through the thermistor 79 and the thermistor 79 may generate heat. As a result, a detection error may occur in the temperature TB of the battery 3. In particular, if the thermistor 79 is an NTC thermistor as described with reference to FIG. 2, a resistance value of the thermistor 79 decreases when the thermistor 79 generates heat due to superposition of an electromagnetic wave noise. As a result, a positive feedback may act to increase current flowing through the thermistor 79, and the thermistor 79 may demonstrate a thermal runaway. As a result, the thermistor 79 may be damaged.

Various shield films are now in practical use. It may be considered to suppress superimposition of electromagnetic wave noise on the temperature detection lines 71 by disposing an appropriately selected shield film (not shown) on the FPC 7 (see Patent Literature 1, for example). However, if the shield film is added, a member cost and/or manufacturing cost of the FPC 7 may increase accordingly. In order to reduce costs, it is desirable to be able to suppress superimposition of an electromagnetic wave noise with a simpler configuration.

Therefore, in the present embodiment, a configuration is adopted in which the temperature detection lines 71 is sandwiched between the voltage detection lines 72 and the battery 3 (a plurality of cells 6) to suppress superimposition of an electromagnetic wave noise on the temperature detection lines 71.

Figure 5:
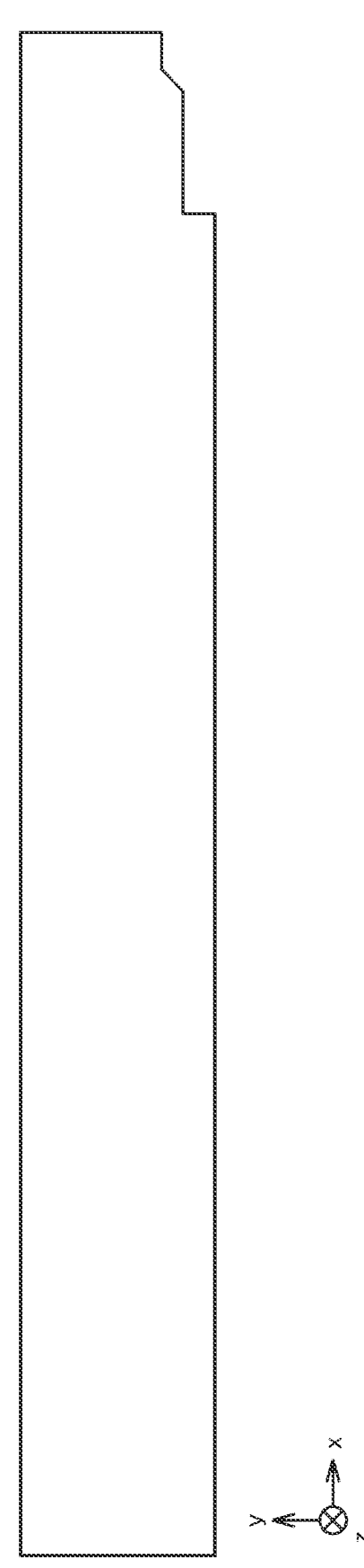
FIG. 5 is a plan view schematically showing an example of an outer shape of a flexible printed circuit board according to a present embodiment.
Figure 6:
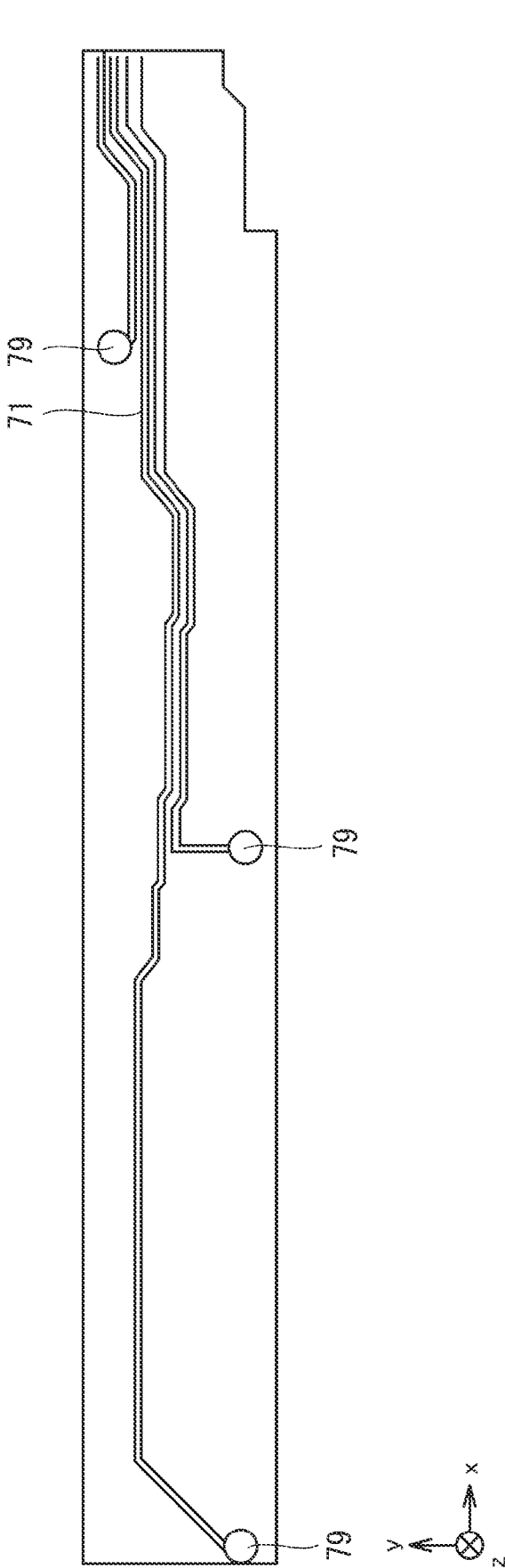
FIG. 6 is a diagram showing an example of a wiring pattern of temperature detection lines.
Figure 7:
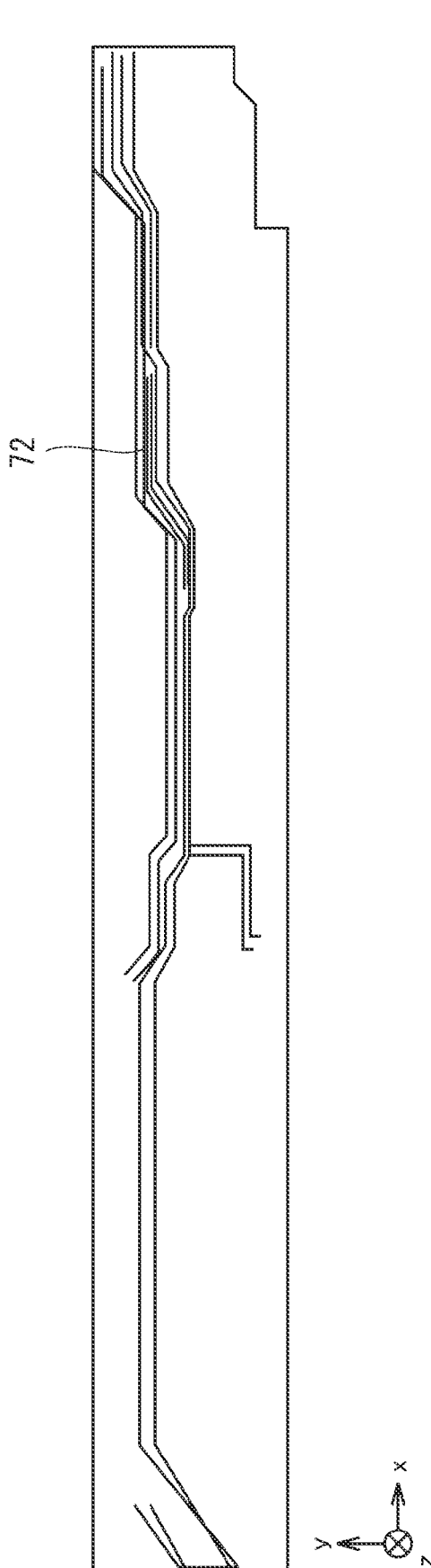
FIG. 7 is a diagram showing an example of a wiring pattern of voltage detection lines.

FIG. 5 is a plan view schematically showing an example of an outer shape of the FPC 7 in this embodiment. FIG. 6 is a diagram showing an example of a wiring pattern of the temperature detection lines 71. FIG. 7 is a diagram showing an example of a wiring pattern of the voltage detection lines 72.

As described with reference to FIG. 4, the wiring pattern of the temperature detection line 71 is arranged on the back surface of the substrate 70 (the back surface of the FPC 7) and the wiring pattern of the voltage detection line 72 is arranged on the front surface of the base material 70 (the front surface of the FPC 7.) FIG. 6 shows the wiring pattern of the temperature detection line 71, which may be confirmed in a case that the FPC 7 is observed toward from the lower side (a side of the back surface) to the upper side (a side of the front surface.) On the other hand, FIG. 7 shows the wiring pattern of the voltage detection line 72, which is confirmed in the case that the FPC 7 is observed in a plane view in a transmissive manner from the lower side to the upper side.

As can be understood from FIGS. 6 and 7, the wiring pattern of the temperature detection line 71 and the wiring pattern of the voltage detection line 72 are substantially the same, although the surfaces on which they are arranged are different between the front surface and the rear surface of the substrate 70. This enables a configuration in which the temperature detection lines 71 are sandwiched from both sides by the voltage detection lines 72 and the cells 6.

The voltage detection lines 72 function as shield lines which electrically shield the temperature detection lines 71 and improves noise resistance of the temperature detection lines 71. On the other hand, an electromagnetic wave noise may be superimposed on the voltage detection lines 72. An electromagnetic wave noise superimposed on the voltage detection lines 72 can be transmitted to the battery ECU 2 in the same manner as an electromagnetic wave noise superimposed on the voltage detection lines 72. However, the electromagnetic wave noise reaching the battery ECU 2 can be reduced to a level at which the detection error of the voltage VB does not pose a problem by providing an appropriate filter circuit (not shown) in the battery ECU 2. Further, since the filter circuit may be a general RC circuit, it can be arranged at a lower cost than the shield film. Therefore, according to the present embodiment, it is possible to reduce the cost required for countermeasures against an electromagnetic wave noise.

Also, no thermistor is connected to the voltage detection lines 72 for detecting the voltage VB of the battery 3. Therefore, even if an electromagnetic wave noise is superimposed on the voltage detection lines 72, the thermistor does not generate heat unlike the situation where an electromagnetic wave noise is superimposed on the temperature detection lines 71. Consequently, damage to the thermistor due to a thermal runaway does not occur. Therefore, according to this embodiment, the thermistor 79 can be protected more reliably.

Although a configuration, in which the temperature detection lines 71 are shielded by the voltage detection lines 72 in FIGS. 6 and 7, a wiring pattern not used for signal transmission (so-called dummy pattern) may be disposed instead of the voltage detection lines 72.

Figure 8:
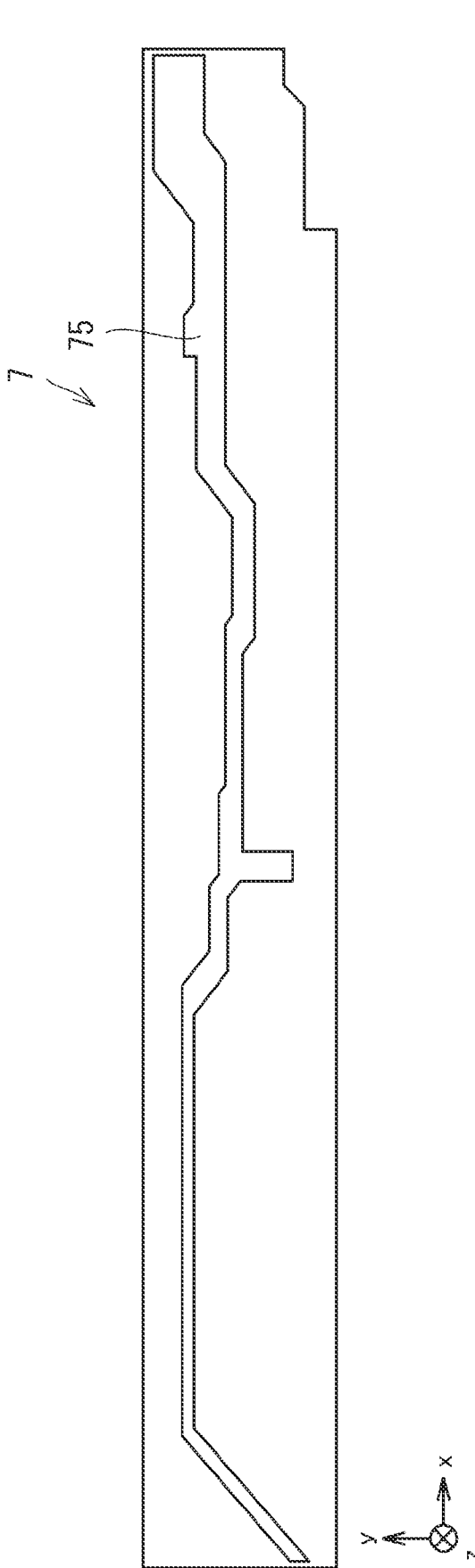
FIG. 8 is a diagram showing an example of a dummy pattern arranged on a flexible printed circuit board.

FIG. 8 is a diagram showing an example of dummy patterns arranged on the FPC 7. FIG. 8 shows, similar to FIG. 7, a wiring pattern, which is confirmed in the case that the FPC 7 is observed in a plane view in a transmissive manner from the lower side to the upper side. As shown in FIG. 8, dummy patterns 75 may be provided so as to cover the wiring pattern of the temperature detection lines 71. Although not shown, for example, a cell discrimination signal line or a ground line may be used instead of or in addition to the dummy pattern 75.

However, the dummy pattern 75 requires a wider wiring area than the voltage detection line 72. Therefore, it is possible to improve the noise resistance of the temperature detection lines 71 even in a region where there is no space for arranging layout of a wiring by using the voltage detection line 72.

As described above, in the present embodiment, the voltage detection line 72 is arranged to overlap the temperature detection line 71 in the case that the FPC 7 is observed in a plane view in a transmissive manner from the bottom to the top. In other words, the voltage detection lines 72 are arranged to cover the temperature detection lines 71. Since the voltage detection lines 72 function as a shield line by employing a configuration in which the temperature detection lines 71 are sandwiched between the voltage detection lines 72 and the cells 6, it is possible to improve the noise resistance of the temperature detection lines 71. Moreover, since the FPC 7 has a simple structure in which a dedicated shield layer (such as a shield film) is not provided, it can be manufactured at low cost. Therefore, according to the present embodiment, it is possible to suppress superimposition of an electromagnetic wave noise on the temperature detection lines 71 with a simple configuration.

In this embodiment, the configuration in which the temperature detection lines 71 are used to detect the temperature TB of the battery 3 has been described. However, the temperature detection lines 71 may be used, for example, to detect an intake air temperature of cooling air for cooling the battery pack 1. Further, a position where the FPC 7 is installed is not limited to the upper surface of the battery 3, but may be a side surface or the lower surface of the battery 3, or a front surface of the metal case accommodating the battery 3.

The embodiments disclosed here should be considered as examples and not restrictive in all respects. The scope of the present disclosure is indicated by the scope of the claims rather than the description of the above-described embodiments, and is intended to include all modifications within the meaning and scope equivalent to the scope of the claims.

What is claimed is:

1. A battery pack, comprising:
an assembled battery; and
a flexible printed circuit board arranged along the assembled battery and configured to detect a voltage and a temperature of the assembled battery, wherein
the flexible printed circuit board includes:
   a substrate having a front surface and a back surface;
   a thermistor which detects the temperature of the assembled battery;
   temperature detection lines electrically connected to the thermistor and arranged between the back surface and the assembled battery; and
   voltage detection lines arranged on the front surface to overlap the temperature detection lines in a case that the flexible printed circuit board is observed in a plane view in a transmissive manner from the back surface to the front surface, and
a wiring pattern of the temperature detection lines and a wiring pattern of the voltage detection lines are substantially the same so that the voltage detection lines function as shield lines which electrically shield the temperature detection lines and improve noise resistance of the temperature detection lines.

2. The battery pack claimed in claim 1, wherein:
the assembled battery is configured with a plurality of cells;
the plurality of cells are arranged in an x-direction; and
the flexible printed circuit board is arranged directly above the plurality of cells.

3. A battery pack, comprising:
an assembled battery; and
a flexible printed circuit board arranged along the assembled battery and configured to detect a voltage and a temperature of the assembled battery, wherein
the flexible printed circuit board includes:
   a substrate having a front surface and a back surface;
   a thermistor which detects the temperature of the assembled battery;
   temperature detection lines electrically connected to the thermistor and arranged between the back surface and the assembled battery; and
   a dummy pattern arranged on the front surface to overlap the temperature detection lines in a case that the flexible printed circuit board is observed in a plane view in a transmissive manner from the back surface to the front surface, and
the dummy pattern and a wiring pattern of the temperature detection lines are substantially the same so that the dummy pattern functions as a shield which electrically shields the temperature detection lines and improves noise resistance of the temperature detection lines.

4. The battery pack claimed in claim 3, wherein the dummy pattern is a wiring pattern not used for signal transmission.

5. The battery pack claimed in claim 3, wherein:
the assembled battery is configured with a plurality of cells;
the plurality of cells are arranged in an x-direction; and
the flexible printed circuit board is arranged directly above the plurality of cells.

* * * * *